Figure 1:
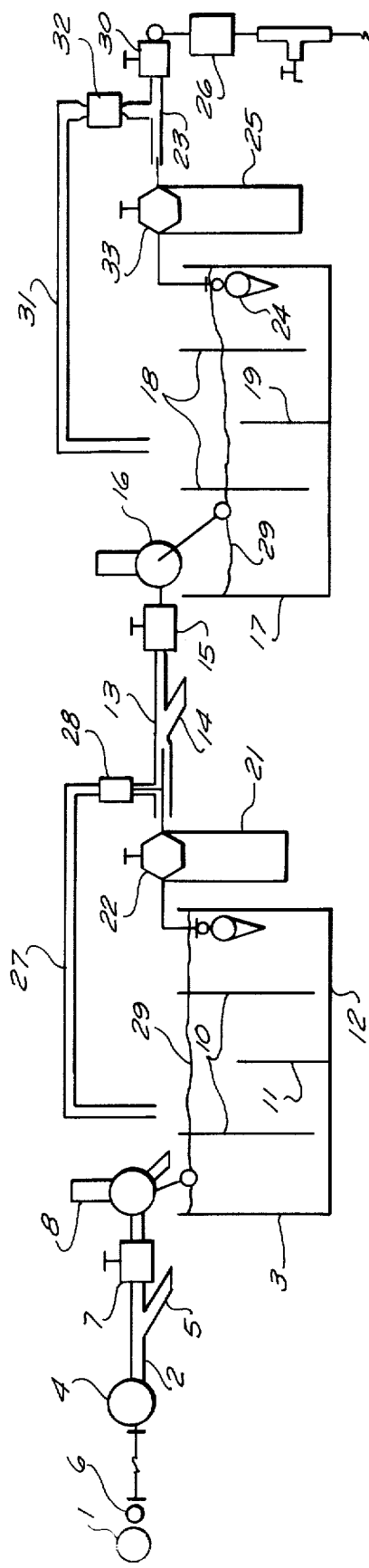

United States Patent [19]
Hanford

[11] 3,883,429
[45] May 13, 1975

[54] PORTABLE WATER SUPPLY SYSTEM

[75] Inventor: William E. Hanford, North Tarrytown, N.Y.

[73] Assignee: World Water Resources, Inc., New York, N.Y.

[22] Filed: Mar. 25, 1974

[21] Appl. No.: 454,174

[52] U.S. Cl. .............. 210/104; 210/195; 210/202; 210/203; 210/242
[51] Int. Cl. ................... B01d 21/24; B01d 29/36
[58] Field of Search.... 210/103, 104, 199, 200–203, 210/242

[56] References Cited
UNITED STATES PATENTS

| | | | |
|---|---|---|---|
| 536,858 | 4/1895 | Donato | 210/242 X |
| 3,120,491 | 2/1964 | Kincaid | 210/242 |
| 3,312,346 | 4/1967 | Walker | 210/202 X |
| 3,482,695 | 12/1969 | Hansen et al. | 210/104 X |
| 3,577,341 | 5/1971 | Keith, Jr. et al. | 210/195 X |
| 3,651,942 | 3/1972 | Berardi | 210/203 X |

*Primary Examiner*—John Adee
*Attorney, Agent, or Firm*—Edward H. Gorman, Jr.

[57] ABSTRACT

An apparatus is provided whereby contaminated water is rendered potable. The apparatus comprises:
  a water source;
  first and second purification tanks each of which is provided with at least one vertical planar baffle,
  a prefiltering means;
  means for pumping water from the source to the first tank, from the first tank to the second tank and from the second tank to an outlet means;
  a chemical addition menas for chemically treating water in the second tank; and
  a first and second recycle means for recycling water in the first and second tanks, respectively.

15 Claims, 4 Drawing Figures

PORTABLE WATER SUPPLY SYSTEM

This invention relates to a water treatment apparatus and more particularly to an apparatus for chemically treating contaminated water to render it potable.

The necessity of purifying water intended for human consumption has long been recognized. A contaminated water supply can be the source of many diseases and, in heavily populated areas where a large number of people consume water originating from the same source, diseases such as dysentery, cholera, and typhoid fever can reach epidemic proportions. These and other waterborne diseases have, of course, been virtually eliminated in most of the urban, densely populated areas of the world through the use of large scale, sophisticated water purification plants.

However, these remedies, which are easily adaptable to areas of affluence or well-organized social structure, have not been found to be as easily applicable to rural areas or developing countries. High cost, sparse population, lack of electrical power and the lack of skilled labor preclude installation of most efficient modern water systems. It is to this problem, namely providing safe, potable water to the people of rural developing areas, that the present invention is directed.

In approaching the problem, a research and development program was initiated to discover a water purification system which could provide maximum efficiency in purification, which could process a relatively large volume of water in a short span of time, which could function continuously, which required little or no electrical power since electrical power is not readily available in rural or underdeveloped areas, and which could be operated by relatively unskilled labor. This research and development program was extremely successful and resulted in the development of the present invention which accomplished all of these elements.

In addition, the present invention is relatively small in size, facilitating easy installation, is low in cost and requires no special skills to maintain. But, most surprisingly, the present invention provides a degree of accuracy in the feeding of chemical purifying agents heretofore unknown in non-electrical water treatment system.

The present invention is an apparatus for treating contaminated water for rendering it potable. Broadly, it comprises a water source;
a first purification tank communicating with the water source by way of a first conduit provided with at least one flexible baffle;
a second purification tank communicating with the first tank by way of a second conduit the second tank being provided with at least one flexible baffle;
a prefiltering means for removing particulate matter from water flowing through the first conduit;
a first recycle means communicating between the second conduit and the first tank the first recycle means having a first normally closed, pressure-relief valve, the valve being open only when a pressure greater than about 8 psi exists in the second conduit;
a first pressure filter, positioned in the second conduit upstream of the first recycle means;
a chemical addition means being positioned in the second conduit between the first recycle means and the second tank, the means being capable of terminating the flow of water into the second tank when the level of water in the second tank reaches a pre-determined height;
an outlet means communicating between the second tank and a purified water distribution means;
a second recycle means communicating between the outlet means and the second tank, the second recycle means having second normally closed, pressure relief valve, the second valve being open only when the pressure in the outlet means exceeds about 8 psi; and
a second pressure filter positioned in the outlet means upstream of the second recycle means.

Figure 2:
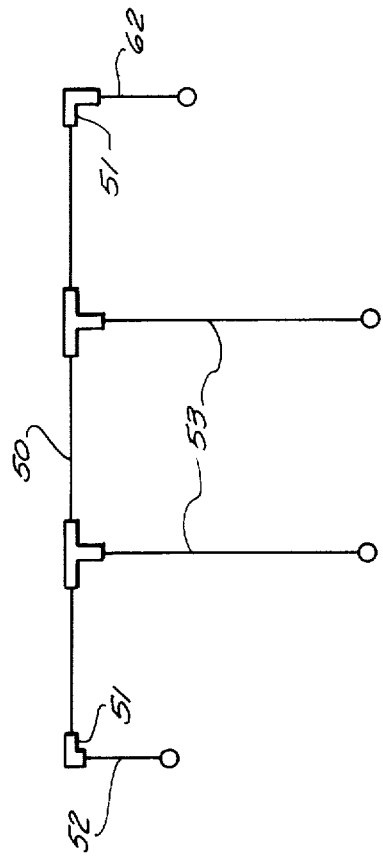
Figure 3:
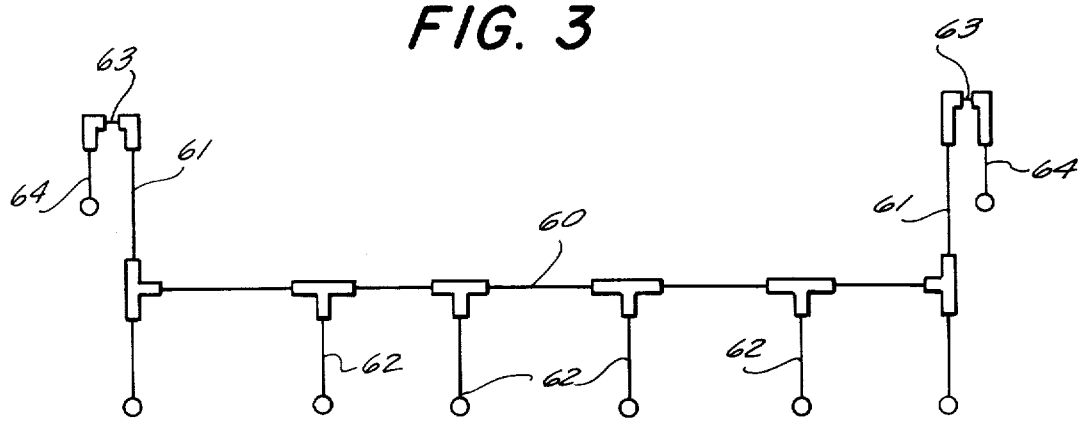
Figure 4:
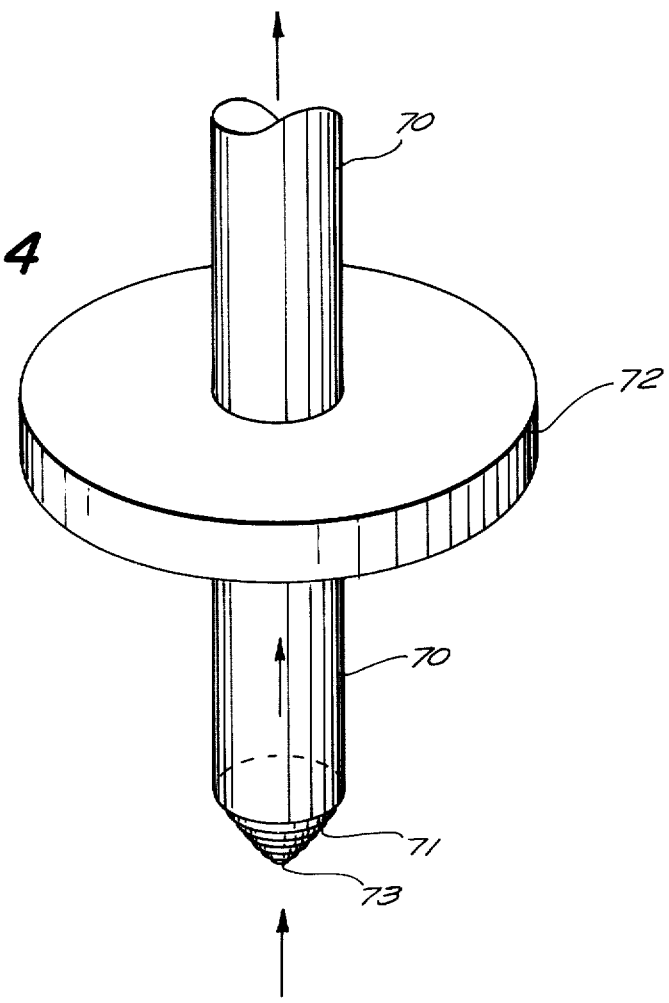

A preferred embodiment of the invention is depicted in the drawings. FIG. 1 is a side view schematic diagram of the invention showing component parts in their relative order of assembly. FIGS. 2 and 3 show typical support structures for the flexible baffles used in the purification tanks. FIG. 4 shows a subsurface skimmer which is particularly useful in withdrawing treated water from the tanks.

Referring to FIG. 1, water to be treated enters the apparatus from a water source 1 through a check valve 6 which prevents back flow from the apparatus. It may be pumped using an electric motor or gasoline engine-driven pumps, it may be siphoned, or it may be introduced into the apparatus by any convenient means.

The water flows through a first conduit 2 into a first purification tank 3. Conduit 2 is provided with a prefiltering means for removing particulate matter. It comprises a coarse filter 4 and a strainer 5. The coarse filter may be any one of many conventional filters, the only prerequisite being that it retain coarse material such as leaves, gravel, marine animals, insects and other debris. The strainer 5, on the other hand, removes smaller particulates. Preferably the strainer retains particles of a size greater than about 75 $\mu$.

The conduit 2 may also be provided with a valve 7 for shutting off the flow of water or for regulating it.

Optionally, conduit 2 is provided with a means 8 for prepurifying the water by adding purifying agents such as calcium hypochlorite, alum or both. Additionally, cationic or anionic flocculating aids can be employed.

Any known device can be used for introducing purifying agents and its selection is well within the ken of a person having ordinary skill in water purification. However, it is preferred to use a chemical purifier such as that disclosed in U.S. Pat. No. 3,727,760 which issued Apr. 17, 1973 to Soriano et al. Such a purifier achieves extreme accuracy in dispensing chemical purificants and requires no auxiliary power to operate. It has been found especially beneficial to employ two such units as means 8, one of which adds calcium hypochlorite to the water, the other alum. Hence, bacterial attack occurs early in the treatment scheme and flocculation of fine particulate matter is enhanced by the alum.

Further with respect to the above patented purifier, it is responsive to the water level downstream in that it acts as a valve when the water level is too high, thereby terminating the flow of water from the source 1.

Next, the water flows from conduit 2 into tank 3 which operates as a temporary holding tank. This permits a residence time for the purifying agents to act on the water, as well as providing time for settling of particulate matter not removed by the prefiltering means 4 and 5. The required residence time, of course, depends on the degree of contamination in the water source, but it is preferable to assure a residence time of at least 12.5 minutes.

Tank 3 is provided with planar baffles 10 and 11 which force the water in the tank to follow a tortuous path before exiting, thereby effectively eliminating short routes through and out of the tank. These baffles are oriented parallel to the axis of the tank, i.e., vertically, and terminate at or near the tank wall. Thus, water flowing through the tank must go around the baffles in order to exit the tank.

The baffles 10 and 11 are constructed of a material which provides resistance to water flow and is preferably flexible. It has been found to be especially advantageous to employ a heavy fabric such as canvas or heavy gauge plastic such as polyvinyl chloride, but any flexible material, impervious to water, may be used.

To support the baffles, it has been found highly desirable to use a framework such as depicted in FIGS. 2 and 3. FIG. 2 shows a supporting structure which is useful for the baffles 10. Lateral member 50 has attached to it the baffles 10. It is supported at the upper sides of the tank at points 51, and weighted members 52 are attached to the extremities of member 50, extending down the outside walls of the tank, thus keeping the framework in place. Vertical members 53 are provided to ensure that the flexible baffles 10 maintain a substantially planar shape. The baffles can be weighted at their lowermost edges to keep them vertically oriented. Of course, other such supporting structures can be used as would be apparent to one skilled in the art.

While baffles 10 terminate at or near the bottom of the tank 12 and extend through the surface of the water 29 (FIG. 1), baffle 11 is positioned such that its uppermost lateral edge is below the surface. A supporting structure for such a submerged baffle is shown in FIG. 3. Lateral member 60 is attached at its extremities to vertical members 61 and intermediately to vertical members 62. Vertical members 61 are attached to lateral members 63 which rest on the upper edge of the tank wall, thereby supporting the framework. Ballast members 64 can be attached to members 63 so as to extend downwards outside the tank walls to keep the framework substantially vertically in place. Baffle 11 is attached to lateral member 60 and members 62 serve to maintain the baffle in a substantially planar configuration. As with baffles 10, baffle 11 can be weighted at the bottom to maintain it in a substantially vertical position. Alternatively, baffle 11 can be affixed removeably to the tank bottom 12.

The water exiting tank 3 enters a second conduit 13 through a subsurface skimmer 20 which is described infra. A strainer 14 may be provided in conduit 13 to remove unsettled flocculant or other particulate matter. Ideally, it retains particles greater than about 75µ in size.

Water entering conduit 13 is passed through a first pressure filter 21 to remove the bulk of any particulate matter such as flocculant which failed to settle out in tank 3. Any such filter known in the art may be employed, but it has been found especially useful to employ one such as is manufactured by Diaclear, Incorporated of Hamden, Connecticut. Although many filtering agents can be used in this filter, it is preferable to employ sand. The pressure filter 21 is operated by a motor 22 which is run on gasoline, electricity or other power source. The motor provides a force sufficient to pump water out of tank 3 and preferably is capable of generating a hydrostatic pressure of at least about 8 psi. Ideally it can provide a pressure of from about 10 to 20 psi or more.

Shutoff valve 15 may be provided to terminate the flow of water through the conduit 13.

The water then passes through a chemical addition means 16 and enters a second purification tank 17. Similarly as with tank 3, tank 17 can be provided with baffles 18 and 19 and supporting structures as are shown in FIGS. 2 and 3. It should provide a substantial residence time to permit the efficient action of the chemical additives from means 16. Preferably, the residence time should be about 12.5 minutes.

Chemical addition means 16 is similar to 8 described supra, and is preferably used to dispense calcium hypochlorite or other bactericidal agent. It is responsive to the water level 29 in tank 17 and closes when the level rises to a predetermined maximum. Thus, means 16 also serves as an automatic shutoff valve, closing conduit 13 when enough water is present in tank 17.

Water from tank 17 enters outlet means 23 through a subsurface skimmer 24 similar to 20 and pressure filter 25 which is structurally similar to pressure filter 21. Motor 33 has a similar capacity to generate hydrostatic pressure as motor 22. Filter 25 is preferably equipped with a pourous bag impregnated with diatomaceous earth such that water is forced to enter the bag, flow through its impregnated walls and out into means 23. Such diatomaceous earth filters are sold by Diaclear, Inc.

The thus purified water may be even further cleaned by passing it through a post-treatment means 26. This may comprise further chemical or physical treatment such as an activated charcoal filter to decolor and deodorize the water, a demineralizer such as ion exchange resins or other known demineralizers, or both. Water exiting outlet means 23 and/or post-treatment means 26 is ready for human consumption or other use.

The system is also provided with recycle means so that water may be filtered and chemically treated many times. Thus it becomes apparent that the residence times of tanks 3 and 17 need not be critical limitations, since many passes through the purification tanks, filters 21 and 25, and chemical addition means 16 are provided.

A first recycle means is provided from conduit 13 so that water exiting tank 3 can be refiltered by filter 23 and re-treated in tank 3. It comprises pipe 27 and valve 28. Valve 28 is a normally closed, pressure relief valve. It is opened by a rise in pressure in conduit 13, preferably when the pressure exceeds about 8-12 psi. As stated supra, when the water level in tank 17 reaches a predetermined level, addition means 16 closes. The pressure buildup in conduit 13 opens valve 28 permitting water to recycle through pipe 27 back into tank 3.

A second recycle means is provided for tank 17. Thus pipe 31 leads from outlet means 23 back to tank 17. Like the first outlet means it is provided with a normally closed, pressure relief valve 32 which opens when the pressure in outlet means 23 exceeds about 8 to 12 psi. Hence, when the outlet means is closed, water recycles through pressure filter 25, valve 32, pipe 31, and into tank 17.

A delayed shutoff means may also be provided. Hence, when valve 28 opens and water begins to recycle back to tank 3, the shutoff means deactivates motor 22 after a predetermined period of time. This is accomplished by any means known to one of reasonable skill such as by providing a timing mechanism which is activated by the pressure in conduit 13 exceeding about 8 psi. The mechanism may be activated by any pressure-sensitive switch or by the opening of valve 28. It has been found particularly useful to preset the delayed shutoff means so that motor 22 is shutoff about 40 minutes after the recycle of water through pipe 27 commences.

Another aspect of the present invention which provides excellent results with the heretofore described apparatus is a subsurface skimmer. A preferred embodiment of the skimmer is depicted in the FIG. 4, and a schematic is depicted in FIG. 1 as 20 and 24. Briefly stated, this apparatus comprises a flexible pipe which communicates at one end with a water outlet means. The other end of the pipe extends below the level of water in a container and has a skimmer filter means attached at its extremity. A slideable ballast means is attached to the pipe such that the ballast can be positioned variably along the axis of the pipe. The skimmer filter means attached to the end of the pipe below the water level comprises a closely wound conical spring which may or may not be provided at its apex with an ancillary ballast means for the purpose of maintaining the skimmer at a vertical position.

It has been found through extensive experimentation that the highest density of bacterial concentration is found near the surface of a body of water, usually within about 12 inches from the surface. Conversely, water containing sediment exhibits the highest density of sediment near the bottom of the body of water. Accordingly it is highly advantageous when water is withdrawn from any of the treatment tanks 3 or 17 shown in FIG. 1 to withdraw water at a point intermediate between these zones of maximum bacteria concentration and maximum sediment concentration. Accordingly, it has been found that an apparatus such as the above described subsurface skimmer is ideal for such a purpose.

Referring to FIG. 4, pipe 70 comprises a flexible pipe which communicates at its upper end with a water outlet means (not shown). The lower end of the flexible pipe communicates with a skimmer filter means 71 which comprises a tightly wound spring. Preferably, the spring is made of a material which is non-corrosive when subjected to water over long periods of time. Accordingly, the spring can be made from a plastic material such as polypropylene, polyethylene, polyvinylchloride, and other polymeric materials which would be known to one of reasonable skill in the art. Alternatively, the spring can composed of a non-corrosive metal such as stainless steal. Pipe 70 is moveable in the vertical direction so that as the level of water in the container in which the skimmer is immersed varies, the position of the skimmer apparatus can also vary accordingly.

Pipe section 70 is fitted with a ballast means 72 which serves to position the skimmer filter means at the appropriate depth, i.e. between the zone of maximum bacteria concentration and the zone of maximum sediment. The ballast means is attached to the pipe 70 such that it can be slided in a vertical direction around pipe 70. This permits the filter means 71 to be preset at a particular depth in the water. The ballast means can be made of any material which would serve the purpose of accurately emplacing the skimmer at the desired depth. It has been found especially desirable to manufacture the slideable ballast from plastic materials such as polyvinylchloride, polyethylene, polypropylene, and other plastics. Also usable are wood, in particular, cork.

The skimmer filter, as stated above is a closely wound, conical spring. The spring may be terminated at its apex by an additional ballast 73 for the purpose of maintaining the skimmer filter in an upright position during its operation.

The present invention is further illustrated by the following example.

EXAMPLE

A community in West Africa had had its water system destroyed. In the reconstruction of its water system, equipment as hereinafter described was used. The unit was delivered unassembled in a 107 cubic foot box, weighing 1,500 pounds. The unit was assembled during 2 days and operated as hereinafter disclosed. Analysis of the primary water is shown in Column A of Chart I attached.

This water was drawn by a siphon from a river through a basket strainer of one-fourth inch diameter, a "Y" strainer of 75 $\mu$, a valve and then entered a first tank which was comprised of a circular tank 18 feet in diameter, 48 inches deep which held 7,420 gallons of water. This tank had steel outer walls and a 20 gauge plastic liner. The tank was divided by three baffles; two upper baffles having links of 12 feet each and a lower baffle of 18 feet in length. The water entered the tank, passed under one 12 foot baffle, over the 18 foot baffle, under the second 12 foot baffle and out.

As this water entered the first tank, it was treated with a solution of alum, being about 20 ppm and chlorine, being about 3 ppm. This solution was made-up automatically from the clear water tap of the entire unit, in a tank placed above the first primary tank. Two chemical feeders of the type manufactured by World Water Resources, Inc., of New York, New York, were used. One of these feeders fed calcium hypochlorite in the form of tablets manufactured by Olin Corporation of Stamford, Connecticut under the trade name of HTH, so that a solution of 300 ppm of available chlorine was obtained. The other feeder of the same type fed blocks of approximately 1 cubic inch of alum into the water such that a solution of 2,000 ppm existed. This solution of chlorine, alum in water was then gravity fed through a valve into the supply line of the raw water for tank L, thus providing pre-chlorination and floculation.

The water in the first tank which had most of the floculants settle during the passage over and under the baffles was removed from the tank by a sub-surface skimmer, as previously described. This skimmer was set for a depth of 14 inches. The Water was then drawn through a three-fourths horse power electric pump and was pushed through a sand filter of the kind manufactured by Diaclear Corporation of Hamden, Connecticut. The filter used was an 18 gallon stainless steel model, high-pressure sand filter.

At this point, the water had two possible routes; one was through another chemical additive device of the kind manufactured by World Water Resources where a final chlorination of 3 ppm was added to the water as it entered the second tank. When the second tank was full, the chemical feeder sensed the tank's fullness and automatically turned-off. At this time a pressure relief system prior to the tank automatically opened and took the water from the sand filter and returned it to the mid-point of the first tank, thus allowing the water to circulate from the first tank through the filter back into the first tank, i.e. the second route. A timing mechanism was used so that the sand filter pump turned-off after 40 minutes of operation on the re-cycle mode but automatically operated once again when the chemical feeder entering the second tank demanded more water.

The water that entered the second tank, which was similar in design to the first tank, passed over similar baffle construction and a similar subsurface skimmer set at 15 inches and passed through a pump into a high-pressure Diatomaceous Earth filter of the kind manufactured by Diaclear Corporation. As the water left this filter, it had two possible routes. Route No. 1 was through an activated charcoal filter of the kind manufactured by AMF Cuno and then through an ion-exchange filter of the kind manufactured by Barnstead. The water from this filter was then passed into the delivery system and some was returned when needed to the first alum/chlorine tank. Water exiting from this system had characteristics as shown in Column B of Chart I.

When there was no demand for water, no water passed through the charcoal filter or through the ion-exchange filter. Instead, the water took route No. 2, re-circulating back into the second tank using the same basic mechanism as was used on the first tank. However, no timer was used on this tank and the pump and filter were allowed to function constantly.

CHART I

|  | Untreated A | Treated B |
| --- | --- | --- |
| Color (Pt-Co Scale) | 25 | 7 |
| Turbidity (JTV Scale) | 75 | 3 |
| pH | 7.5 | 7.6 |
| Odor | poor | none |
| Taste | poor | none |
| Deposit | moderate | none |
| Bicarbonate ($HCO_3$) | 253 | 0 |
| Carbonate ($CO_3$) | 251 | 0 |
| Chloride (Cl) | 110 | 300 |
| Sulphate ($SO_4$) | 35 | 0 |
| Nitrate ($NO_3$) | 0.9 | 0.9 |
| Nitrite ($NO_2$) | 0.01 | 0 |
| Fluoride (F) | 5.2 | 5.2 |
| Boron (B) | trace | trace |
| ε Anions | 555.1 |  |
| Sodium (Na) | 704 | 815 |
| Potassium (K) | 24 | 24 |
| Calcium (Ca) | 6 | 0 |
| Magnesium (Mg) | 2 | 0 |
| Iron (Fe × Fe) | 0.4 | 0 |
| Ammonium ($NH_4$) | trace | 0 |
| Aluminium (Al) | trace | 0 |
| Manganese | trace | 0 |
| Heavy Metals (Pb, Cu, Zn) | trace | 0 |
| ε Cations | 636.7 |  |
| Hardness Carbonate ($CaCO_3$) | 10 | 10 |
| $CO_2$ Free | trace | trace |
| Hardness Non Carbonate ($CaCO_3$) | trace | trace |
| Hardness Total ($CaCO_3$) | 10.1 | 10.1 |
| $SiO_2$ | 30 | 0 |
| Biochemical Oxygen Demand | 70 | 1 |
| Total Dissolved Solids Residue Dried at 180°C | 250 | trace |
| Total Dissolved Solids After Ignition | 230 | 0 |

What is claimed is:

1. An apparatus for rendering contaminated water potable which comprises a water source;

a first purification tank communicating with the water source by way of a first conduit provided with at least one flexible baffle;

a second purification tank communicating with the first tank by way of a second conduit the second tank being provided with at least one flexible baffle;

a prefiltering means for removing particulate matter from water flowing through the first conduit;

a first recycle means communicating between the second conduit and the first tank the first recycle means having a first normally closed, pressure-relief valve, the valve being open only when a pressure greater than about 8 psi exists in the second conduit;

a first pressure filter, positioned in the second conduit upstream of the first recycle means;

a chemical addition means being positioned in the second conduit between the first recycle means and the second tank, the means being capable of terminating the flow of water into the second tank when the level of water in the second tank reaches a pre-determined height;

an outlet means communicating between the second tank and a purified water distribution means;

a second recycle means communicating between the outlet means and the second tank, the second recycle means having a second normally closed pressure relief valve, the second valve being open only when the pressure in the outlet means exceeds about 8 psi; and a second pressure filter positioned in the outlet means upstream of the second recycle means.

2. The apparatus of claim 1 in which the prefiltering means comprises a coarse filter and a straining means, the straining means being capable of removing particulate matter having a particle size greater than about 75 $\mu$ from water entering the first tank.

3. The apparatus of claim 1 in which the first and second tanks are each provided with three flexible baffles.

4. The apparatus of claim 1 in which each of the second conduit and the outlet means is provided with a subsurface skimmer positioned beneath the surface of the water level in the first and second purification tanks, such that water entering the second conduit and the outlet means emanates from a level in the tanks intermediate between the level of maximum bacteria density and the level of maximum particulate matter density.

5. The apparatus of claim 1 in which the first pressure filter comprises a sand filter.

6. The apparatus of claim 1 in which the second pressure filter comprises a diatomaceous earth filter.

7. The apparatus of claim 2 in which a chemical pretreatment means is provided between the prefilter means and the first tank, the pretreatment means comprising at least one chemical preaddition means responsive to the level of water in the first tank such that the preaddition means is closed when the level of water in the first tank reaches a predetermined height.

8. The apparatus of claim 7 in which there are provided two preaddition means, the first preaddition means being capable of adding a salt of hypochloric acid to water entering the first tank and the other preaddition means being capable of adding alum to the water entering the first tank.

9. The apparatus of claim 1 in which a post-treatment means is provided downstream of the second recycle means.

10. The apparatus of claim 9 in which the postreatment means comprises an activated charcoal filter and a water demineralization means.

11. The apparatus of claim 1 in which a delayed shutoff valve is provided to deactivate the first pressure filter and terminate the flow of water through the first recycle means, the delayed shutoff valve operating at a predetermined time after a pressure greater than about 8 psi exists in the second conduit.

12. The apparatus of claim 1 in which each of the subsurface skimmers comprises
   a flexible pipe which communicates at one end with the second conduit or the outlet means and at the other end with a skimmer filter means,
   a slidable ballast means attached slidably to the pipe such that the ballast means can be variably positioned along the axis of the pipe, and
   a skimmer filter means such that water passing from the first tank into the pipe is filtered before entering the second conduit.

13. The apparatus of claim 12 in which the pipe is constructed of flexible material and the skimmer filter means comprises a closely wound, conical spring.

14. A subsurface skimming apparatus for removing water from a container at a point below the water level in the container which comprises
   a flexible pipe communicating at one end with a water outlet means and the other end extending below the water level in the container and having a skimmer filter means attached thereto,
   a slidable ballast means attached slideably to the pipe such that the ballast means can be positioned variably along the axis of the pipe, and
   a skimmer filter means attached to the end of the pipe below the water level, comprising a closely wound, conical spring.

15. An apparatus for rendering contaminated water potable which comprises
   a water source;
   a first purification tank communicating with the water source by way of a first conduit, the first tank being provided with three flexible baffles;
   a second purification tank communicating with the first tank by way of a second conduit, the second tank being provided with three flexible baffles;
   a prefiltering means for removing particulate matter from water flowing through the first conduit, which comprises a coarse filter and a straining means capable of removing particles having a size greater than about $75\mu$ from water entering the first tank;
   a first recycle means communicating between the second conduit and the first tank, the second recycle means having a first normally closed pressure relief valve, the valve being open only when a pressure greater than about 8 psi exists in the second conduit;
   a first pressure filter positioned in the second conduit upstream of the first recycle means and which comprises a sand filter;
   a chemical addition means being positioned in the second conduit between the first recycle means and the second tank, the means being capable of terminating the flow of water into the second tank when the level of water in the second tank reaches a pre-determined height;
   an outlet means communicating between the second tank and a purified water distribution means;
   a second recycle means communicating between the outlet means and the second tank, the second recycle means having a second normally closed pressure relief valve which is open only when the pressure in outlet means exceeds about 8 psi;
   a second pressure filter positioned in the outlet means upstream of the second recycle means;
   a subsurface skimmer between the second conduit and the first tank at a point beneath the surface of the water in the first tank, and a subsurface skimmer between the outlet means and the second tank at a point beneath the surface of the water in the second tank, each of the skimmers comprising (a) a flexible pipe which communicates at one end with the second conduit or the outlet means and at the other end with a skimmer filter means, (b) a slideable ballast means attached slideably to the pipe such that the ballast means can be variably positioned along the axis of the pipe, and (c) a skimmer filter means such that water passing into the pipe is filtered before entering the second conduit or the outlet means; and
   a delayed shutoff valve to deactivate the first pressure filter and terminate flow through the first recycle means, the delayed shutoff valve operating at a predetermined time after a pressure greater than about 8 psi exists in the second conduit.

* * * * *